(12) United States Patent
Parnes

(10) Patent No.: US 6,614,801 B1
(45) Date of Patent: Sep. 2, 2003

(54) CIRCUITS AND METHODS FOR DETECTING THE MODE OF A TELECOMMUNICATIONS SIGNAL

(75) Inventor: Gary Parnes, Plymouth, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 09/191,501

(22) Filed: Nov. 13, 1998

(51) Int. Cl.$^7$ .................................................. H04J 3/22
(52) U.S. Cl. ...................................... 370/465; 270/236
(58) Field of Search ................................ 370/464, 465, 370/901; 709/217, 218, 219, 220, 221, 222, 230; 710/11; 713/1, 100

(56) References Cited

U.S. PATENT DOCUMENTS

| | | | |
|---|---|---|---|
| 4,667,065 A | 5/1987 | Bangerter | 379/351 |
| 4,672,602 A | 6/1987 | Hargrave et al. | 370/58 |
| 5,012,470 A * | 4/1991 | Shobu et al. | 370/110.1 |
| 5,119,412 A | 6/1992 | Attallah | 379/102 |
| 5,267,301 A | 11/1993 | Nishii | 379/93 |
| 5,271,058 A | 12/1993 | Andrews et al. | 379/210 |
| 5,299,260 A | 3/1994 | Shaio | 379/265 |
| 5,361,374 A | 11/1994 | Sasaki et al. | 395/800 |
| 5,400,327 A | 3/1995 | Dezonno | 370/62 |
| 5,481,605 A | 1/1996 | Sakurai et al. | 379/243 |
| 5,526,416 A | 6/1996 | Dezonno et al. | 379/265 |
| 5,557,668 A | 9/1996 | Brady | 379/212 |
| 5,563,937 A | 10/1996 | Bruno et al. | 379/201 |
| 5,572,585 A | 11/1996 | Tsutsui | 379/242 |
| 5,572,586 A | 11/1996 | Ouchi | 379/246 |
| 5,581,560 A | 12/1996 | Shimada et al. | 370/527 |
| 5,633,924 A | 5/1997 | Kaish et al. | 379/266 |
| 5,675,617 A | 10/1997 | Quirk et al. | 375/365 |
| 5,684,825 A | 11/1997 | Ko | 375/222 |
| 5,706,434 A * | 1/1998 | Kremen et al. | 395/200.09 |
| 5,974,055 A * | 10/1999 | Imanishi | 370/503 |
| 6,130,625 A * | 10/2000 | Harvey | 340/825.72 |
| 6,259,706 B1 * | 7/2001 | Shimada | 370/466 |

FOREIGN PATENT DOCUMENTS

| | | | |
|---|---|---|---|
| JP | 04373255 A | 12/1992 | H04N/1/32 |
| WO | 97/29563 | 8/1997 | H04J/3/16 |

OTHER PUBLICATIONS

English–language Abstract of JP 04 373255 A, published Dec. 25, 1992 (Ricoh Co. Ltd.), cited above.

* cited by examiner

Primary Examiner—Hassan Kizou
Assistant Examiner—David Odland
(74) Attorney, Agent, or Firm—Schwegman, Lundberg, Woessner & Kluth, P.A.

(57) ABSTRACT

A method for detecting the mode of a telecommunications signal is provided. The method receives the telecommunications signal and contemporaneously evaluates the telecommunications signal for compliance with at least two signal modes. When the evaluation indicates that the signal conforms to a first mode, the signal is processed as a first mode signal. When the evaluation indicates that the signal conforms to a second mode, the signal is processed as a second mode signal.

35 Claims, 4 Drawing Sheets

CIRCUITS AND METHODS FOR DETECTING THE MODE OF A TELECOMMUNICATIONS SIGNAL

TECHNICAL FIELD OF THE INVENTION

The present invention relates generally to the field of telecommunications and, in particular, to circuits and methods for detecting the mode of a telecommunications signal.

BACKGROUND

Telecommunications systems connect users at geographically dispersed locations. The public switched telephone network (PSTN) evolved around providing a narrow-band medium for carrying voice traffic between users. More recently, the PSTN has been used to carry data to and from computers that connect to the PSTN with modems. These modems tropically carry data with bit rates of up to 56 Kbps.

The integrated services digital network (ISDN) was developed to carry higher bandwidth traffic over the existing local loop facilities of the PSTN. This network allows voice or data to be carried in digital form from user to user over the network. Various protocols or modes exist for transporting data over an ISDN network. Thus, the existing networks provide means for transporting telecommunications signals of a number of different modes between users. These modes are, essentially, incompatible and conventional equipment is typically dedicated to a specific telephone number such that a specific device only receives signals of a designated mode.

For the reasons stated above, and for other reasons stated below which will become apparent to those skilled in the art upon reading and understanding the present specification, there is a need in the art for circuits and methods for handling a variety of signal modes with a single number.

SUMMARY OF THE INVENTION

The above mentioned problems with telecommunications circuits and other problems are addressed by the present invention and will be understood by reading and studying the following specification. A system and method for detecting the mode of a telecommunications signal is described which contemporaneously evaluates the signal for compliance with at least two signal modes. This evaluation is accomplished by analyzing a bit stream of the telecommunications signal over a period of time, e.g., up to 2 seconds. In one embodiment, the mode is determined when a frame is successfully decoded from the bit stream according to one of the signal modes. Further, the method also keeps a score for each mode as the signal is evaluated to assist in determining the mode of the signal.

In particular, in one embodiment, a method for detecting the mode of a telecommunications signal is provided. The method receives the telecommunications signal and contemporaneously evaluates the telecommunications signal for compliance with at least two signal modes. When the evaluation indicates that the signal conforms to a first mode, the signal is processed as a first mode signal. When the evaluation indicates that the signal conforms to a second mode, the signal is processed as a second mode signal.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
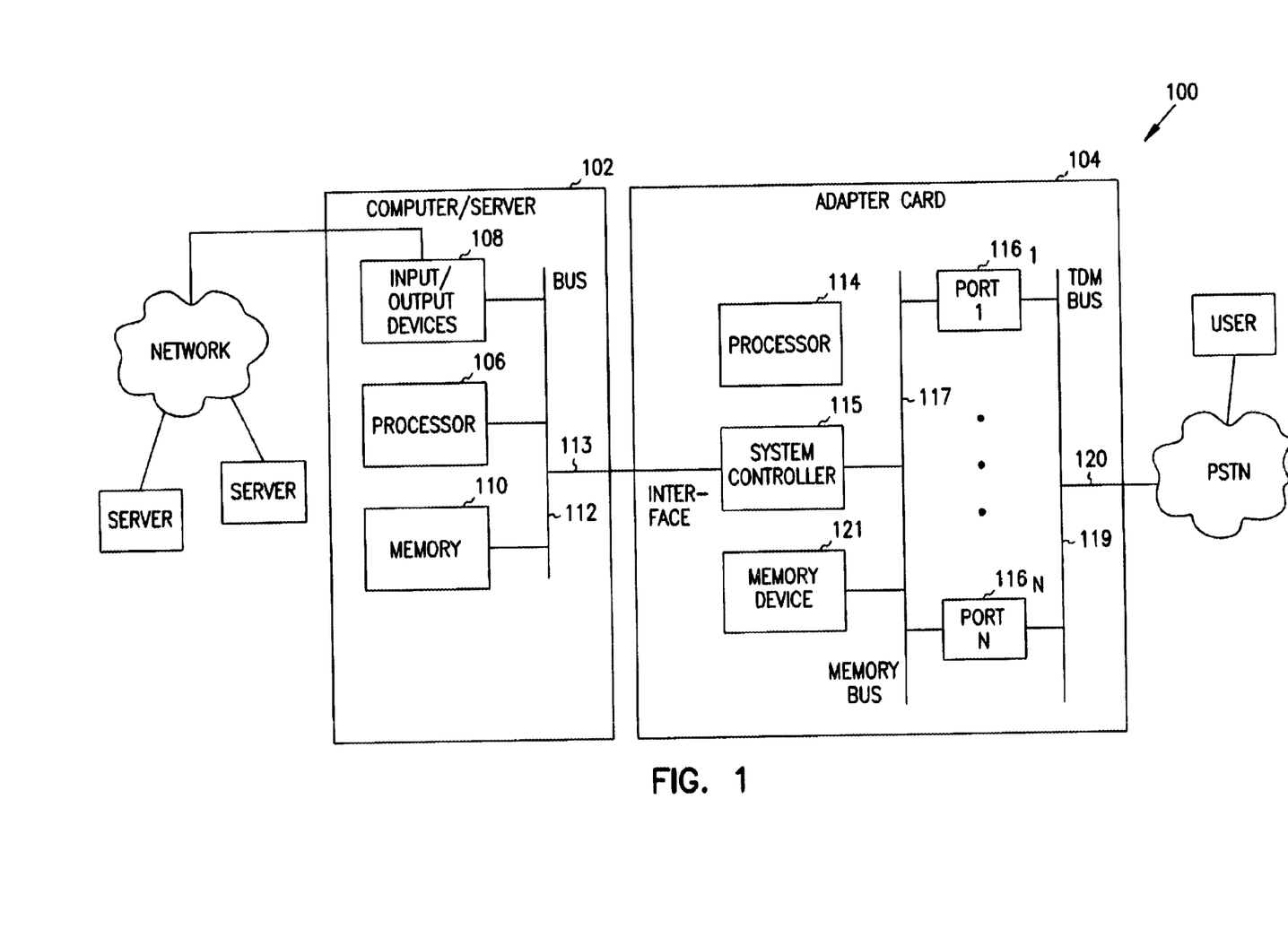
FIG. 1 is a block diagram of an illustrative embodiment of the present invention.

FIG. 1 is a block diagram of an illustrative embodiment of the present invention. System 100 includes computer 102 that is coupled to adaptor card 104. Adaptor card 104 provides a number of ports, $116_1, \ldots, 116_N$ for system 100 so as to allow system 100 to function as a Remote Access Server (RAS). Each port $116_1$ comprises a digital signal processor (DSP) and can receive signals in one of a number of modes. For example, port $116_1$ can receive signals in 56K HDLC mode, 64K HDLC mode, or other mode for telecommunications signals. Adaptor card 104 includes a process that is loaded into a port when an incoming signal is received to detect the mode of the signal.

Adaptor card 104 resides in an interface slot on the main or mother board of computer 102. Computer 102 comprises, for example, a microprocessor-based computer or server. Computer 102 includes processor 106, input/output devices 108, and memory 110 that are interconnected on the main board by bus 112. Input/output devices 108 include, for example, network connections, communications ports, and other conventional devices for connecting with external systems and networks.

Processor 106 is communicatively coupled to processor 114 of adaptor card 104 through interface 113 and system controller 115. Processor 114 communicates with ports $161_1, \ldots 116_N$, over bus 117.

Ports $116_1, \ldots 116_N$ communicate with, for example, the public switched telephone network (PSTN) over communication link 120, e.g., T1, E1 or other appropriate communication link. Adaptor card 104 includes a time division multiplexing (TDM) bus 119 that couples ports $116_1, \ldots, 116_N$ with communication link 120.

In operation, adaptor card 104 detects the mode of an incoming telecommunications signal based on the bits in the bit stream of the telecommunications signal. When an incoming telecommunications signal is received, processor 114 places a selected port into reset, e.g., port $116_1$. A code image from memory devices 121 is loaded into port $116_1$. In one embodiment, this code image includes a detection process that detects the mode of the incoming telecommunications signal as well as code to process the signal in at least two modes. For example, the code image can include code to implement the processes described below with respect to FIGS. 2, 3A and 3B. Code to detect other appropriate modes can also be loaded into the selected port.

Processor 114 then takes port $116_1$ out of reset. The detection process then contemporaneously analyzes the incoming telecommunications signal for compliance with at least two modes for a period of time, e.g., two seconds. This analysis for the two modes is accomplished as data is received.

If the detection process identifies the mode of the incoming telecommunications signal, then the port processes the signal accordingly. If, however, the mode is not identified by the detection process, then another code image, e.g., for processing an analog data stream, can be loaded into port $116_1$. It is noted that in other embodiments, if the detection process fails to identify the mode of the telecommunications signal, then code containing additional detection algorithms can be loaded into the port.

Figure 2:
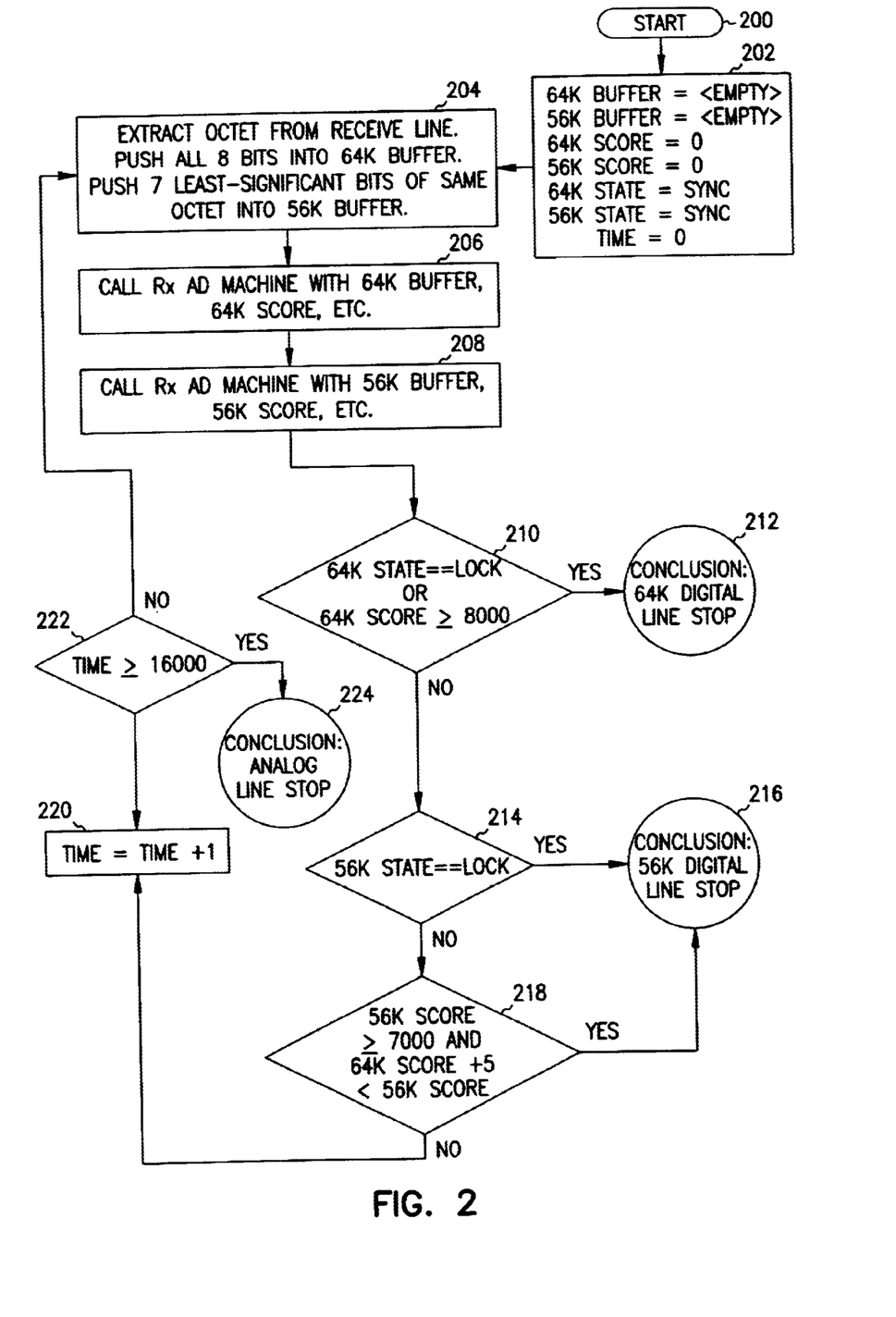
FIG. 2 is a flow chart of an embodiment of a process for detecting the mode of a telecommunications signal.

FIG. 2 is a flow chart of an embodiment of a process for detecting the mode of a telecommunications signal. In this embodiment, the process analyzes a bit stream of the telecommunications signal to determine whether the signal is in a 64 kbps high level data link control (HDLC) mode, a 56 kbps HDLC mode or another mode, e.g., an analog data stream. It is noted that this process can be adapted to detect other modes and other data rates for telecommunications signals.

To detect the mode of the telecommunications signal, the process contemporaneously processes the bit stream of the telecommunications signal under at least two potential modes for a time period, e.g., up to two seconds. During this time period, the process evaluates the signal's compliance with the potential modes.

As one measure of compliance, the process assigns a "score" to the modes under consideration as the bit stream is processed. The score for each mode is modified throughout the time period as the bit stream is processed. Each mode has a target score. When a target score is reached, the process identifies the mode that achieved the target score as the mode of the telecommunications signal.

Further, the process can detect the mode of the telecommunications signal based on compliance with other aspects of the mode. For example, the mode of the telecommunications signal can be identified when an error-free frame has been successfully decoded under one of the modes. Compliance in other aspects of a mode can also be used to identify the mode of the telecommunications signal.

The process of FIG. 2 begins analyzing a telecommunications signal (the "signal") at block 200. In one embodiment, this signal comprises a bit stream that is received from a digital communication line, e.g., an ISDN line. At block 202, the process initializes a number of variables used to monitor the compliance of the signal with two or more potential modes. For example, the process initializes the variables identified below in Table 1.

TABLE 1

| Variable | Description | Value |
|---|---|---|
| 64K buffer | FIFO Queue for analyzing compliance with 64K HDLC mode | empty |
| 56K buffer | FIFO Queue for analyzing compliance with 56K HDLC mode | empty |
| 64K score | Running score of processing under the 64K HDLC mode | 0 |
| 56K score | Running score of processing under the 56K HDLC mode | 0 |
| 64K state | Derived state of processing under 64K HDLC mode | SYNC |
| 56K state | Derived state of processing under 64K HDLC mode | SYNC |
| Time | Running time from initiation of the detection process | 0 |

At block 204, the process extracts groups of bits (e.g., 8 bits or an octet) from the telecommunications line. The process further pushes the 8 bits into the 64K buffer for processing and monitoring as a 64K HDLC mode signal. Further, the process pushes the 7 least significant bits of the same octet into the 56K buffer for processing as a 56K HDLC mode signal.

At blocks 206 and 208 the process calls functions that test the data in the 64K buffer and the 56K buffer for compliance with their respective modes. These functions keep score for the modes under consideration using the 56K score and 64K score variables. These variables track how closely the signal fits within their associated modes of operation. For example, points can be awarded according to the following table:

TABLE 2

| Event | Points |
|---|---|
| Consecutive idle flags | 1 |
| Erroneous data frame | −1 × number of octets in frame |
| Aborted data frame | −1 × (number of octets in frame +1) |

If a score falls below zero, the score is reset to zero. With this scoring format, the target score for a two second interval of a 64K HDLC mode signal is 8000 and the target score for a 56K HDLC mode signal is 7000 for a similar two second interval. This represents the number of idle flags that would be transmitted during half of this time period assuming no data frames are transmitted.

If a data frame is transmitted, then one of the modes of operation may successfully decode an error free data frame. In that case, the mode that decodes the error free data frame is declared the winner since the probability of decoding an error free data frame from an otherwise meaningless stream of data is effectively nil.

A specific embodiment of a test process using this scoring format is described with respect to FIGS. 3A and 3B below. It is noted that other scoring formats and criteria can be used to test the compliance of a signal with other particular modes of operation.

Beginning at block 210, the process analyzes the results of the data returned by the test functions. At block 210, the process determines whether the a 64K HDLC data frame has been decoded error-free (i.e., 64K state==Lock) or the whether the 64K HDLC mode has achieved its target score, e.g., 8000. If so, the process indicates that the telecommunications signal is in 64K HDLC mode at block 212. If not, the process proceeds to block 214.

At block 214, the process determines whether a 56K HDLC data frame has been decoded error-free (i.e., 56K state==lock). If so, the process proceeds to block 216 and indicates that the telecommunications signal is in 56K HDLC mode. If a 56K HDLC frame has not been decoded error-free, the process proceeds to block 218 and checks the score from the test function for the 56K HDLC mode. If the score is greater than 7000 and the score is at least 5 points greater than the score for the 64K HDLC mode, then the process determines that the telecommunications signal is a 56K HDLC signal at block 216. This addresses the unique case of misinterpreting a 64K non-shared-zero-bit idle pattern as a 56K shared-zero-bit idle pattern.

If, at block 218, the score for the 56K HDLC mode does not pass the tests, then the process proceeds to block 220. At block 220, the time variable is incremented. At block 222, the time variable is tested to determine whether the time period of, for example, 2 seconds has lapsed. If yes, then the process concludes at block 224 that the telecommunications signal is not in either 56K or 64K HDLC mode. If time has not elapsed, the process returns to block 204 and processes the next group of bits.

When the mode is determined, the process further processes the signal according to the identified mode.

Figure 3A:
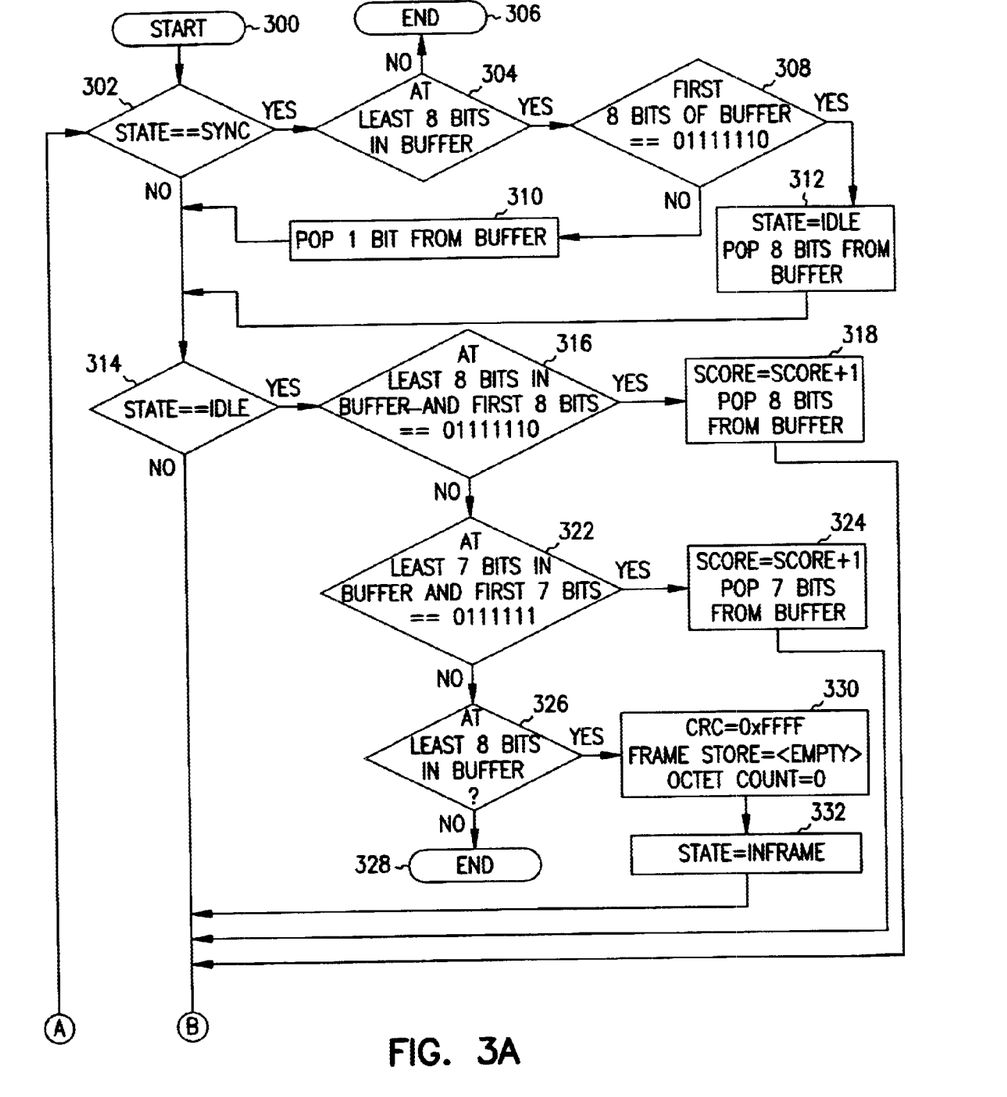
FIGS. 3A and 3B are flow charts of an embodiment of a process for evaluating the compliance of a telecommunications signal with a selected mode.
Figure 3B:
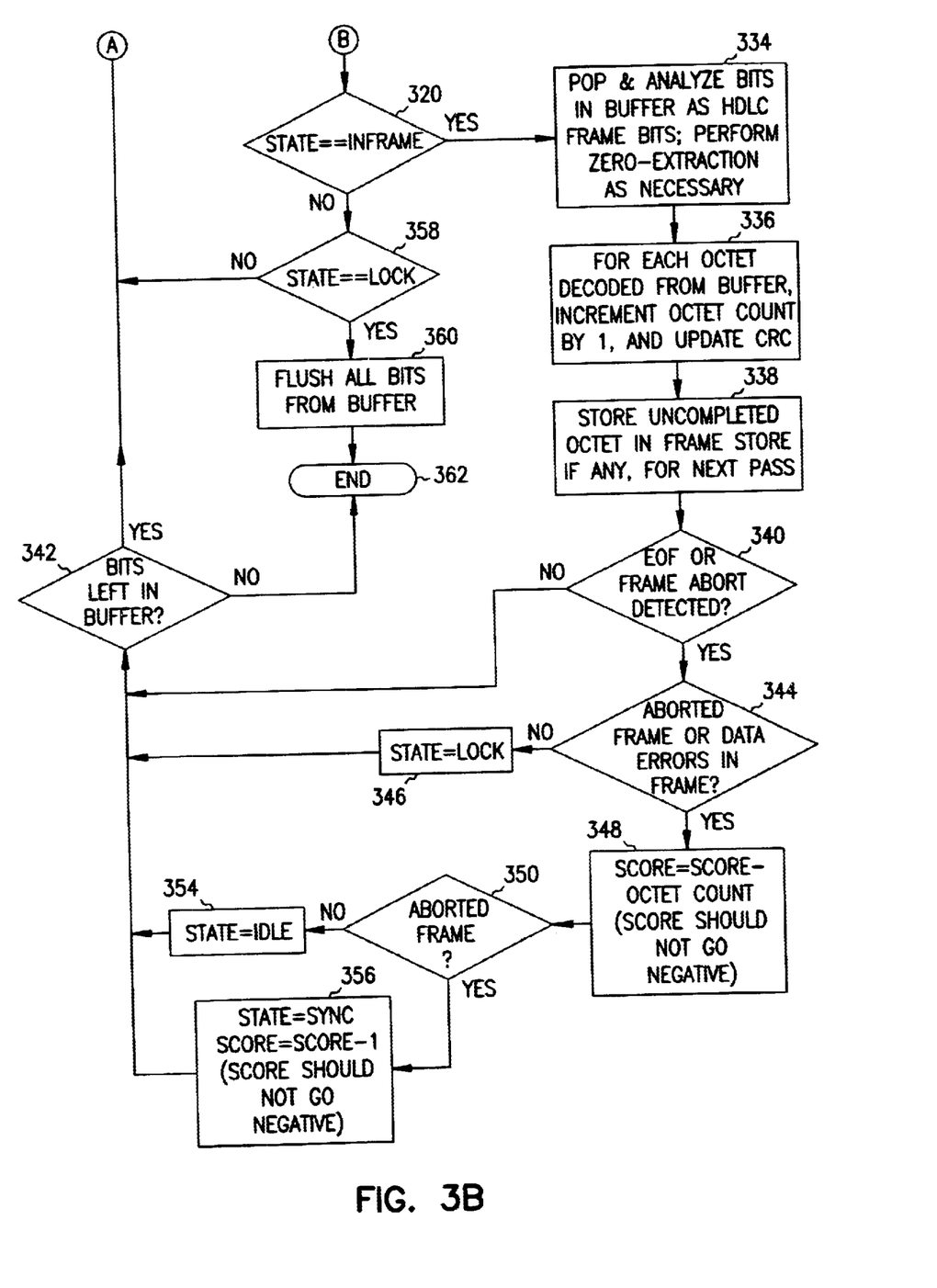

FIGS. 3A and 3B are flow charts of an embodiment of a process or "test function" for evaluating a telecommunications signal for compliance with a selected mode, e.g., 56K HDLC or 64K HDLC signal modes. The process of FIGS. 3A and 3B is repeatedly called by a higher level process, e.g., the process of FIG. 2 at blocks 206 and 208, to analyze the telecommunications signal as its bit stream is received. The process uses a number of variables identified below in Table 3.

TABLE 3

| Variable | Definition |
| --- | --- |
| State | Tracks the detected state of the telecommunications signal |
| Score | Tracks the score for the selected mode |
| CRC | Stores value for cyclic redundancy check as octets are processed |
| Frame Store | Buffers fragments of an octet at the end of a pass through the process |
| Octet Count | Counts the number of octets in a frame |

For HDLC signals, the process performs a number of different operations depending on the detected state of the signal as represented by the variable state. Table 4 identifies the various states of the telecommunications signal.

TABLE 4

| State | Description |
| --- | --- |
| SYNC | The initial state during which portions of the bit stream are compared with flags of the selected mode |
| IDLE | The state after detection of at least one idle flag |
| INFRAME | The state of the signal when a potential frame is being processed |
| LOCK | The state when an error-free frame has been processed |

Looking for an Idle Flag

The process begins at block 300. At block 302, the process determines whether the detected state of the telecommunications signal is still in the initial state, i.e., SYNC. If so, the process looks at the data in the buffer to determine whether the next group of bits, e.g., octet, is an idle flag. For HDLC, the idle flag is 01111110.

At block 304, the process determines whether there are sufficient bits in the buffer to make up an idle flag. If not, the process ends a block 306. If there are sufficient bits the process compares the first 8 bits in the buffer with the idle flag at block 308. If the bits match the idle flag, the process sets the state variable to IDLE and pops the 8 bits from the buffer. The process then proceeds to block 314.

If, at block 308, the bits do not match the idle pattern, the process pops one bit from the buffer at block 310 and proceeds to block 314.

Scoring Idle Flags and Determining When a Potential Frame is Being Processed

The next portion of the process processes idle flags and determines when a potential frame is being received. At block 314, the process determines whether an idle flag has been detected. If so, the process proceeds to block 316 and determines whether at least 8 bits are in the buffer and the first 8 bits match the idle flag. If so, the score variable is incremented by 1 and the 8 bits are popped from the buffer at block 318. This means that consecutive idle flags have been detected. The process then proceeds to block 320.

If, however, the next 8 bits in the buffer did not match the idle flag, then the process looks at the first 7 bits in the buffer at block 322. If the bits match the pattern 0111111, then the process proceeds to block 324 and increments the score variable indicating that consecutive idle flags have been detected. These seven bits are popped from the buffer. The process proceeds to block 320.

If the first 7 bits in the buffer do not match the pattern at block 322, the process proceeds to block 326. At block 326, the process determines whether there are at least 8 bits in the buffer. If not, the process ends at block 328. If there are at least 8 bits in the buffer, then the process determines that a potential frame has been detected because an octet that is not an idle flag was detected after an idle flag. At block 330, the process initializes the CRC, frame store and octet count variables to monitor the success in decoding the potential frame. At block 332, the process sets the state variable to INFRAME.

Processing a Frame

The next portion of the process handles the processing of a potential frame. At block 320, the process determines whether a potential frame is being processed. If so, the process proceeds to block 334 and pops and analyzes bits from the buffer according to the selected mode. For example, the process processes the bits as an HDLC signal and performs zero-extraction as necessary. At block 336, for each octet processed, the process increments the octet count variable by 1 and updates the CRC variable. At block 338, the process stores any incomplete octets inframe store, if any.

At block 340, the process determines whether an end-of-frame (EOF) or a Frame Abort flag was detected. If not, then the data being processed is still within the potential frame and the process proceeds to block 342.

If an EOF or Frame Abort flag was detected, the process proceeds to block 344. If, at block 344, the process determines that an error-free frame was received and that it was not aborted, the process proceeds to block 346 and sets the state variable to LOCK and proceeds to block 342.

If, however, the process determines at block 344, that the frame was aborted or that an erroneous frame was decoded then the process proceeds to block 348. At block 348, the score variable is decremented by the number of octets in the potential frame as indicated by the octet count variable. It is noted that the value of score is capped on the lower end to not go below zero. The process proceeds to block 350.

At block 350, the process determines whether the frame was aborted. If so, the process returns the state variable back to the IDLE state and proceeds to block 342. If the frame was aborted, the process proceeds to block 356. The state variable is returned to the SYNC state and the score is decremented by 1.

At block 342, the process determines if bits remain in the buffer. If not, then the process ends at block 362. If there are more bits, the process proceeds to block 302.

At block 358, the process determines whether an error-free frame has been decoded. If not, the process returns to block 302. If an error-free frame has been decoded, then the process proceeds to block 360 and flushes all of the bits from the buffer. The process ends at block 362.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the process for detecting the mode of a telecommunications signal is not limited to the HDLC modes described herein. Other modes, conventional or later developed, can be detected. Further, other aspects of the telecommunications signal can be monitored and scored to determine the mode of the signal.

What is claimed is:

1. A method, comprising:
    receiving a telecommunications signal, including:
        extracting a group of eight bits from the telecommunications signal, the group of eight bits including seven least-significant bits;
        loading the group of eight bits into a 64K buffer suitable for use in identifying a 64K HDLC mode; and
        loading the seven least-significant bits into a 56K buffer suitable for use in identifying a 56K HDLC mode;
    contemporaneously evaluating the telecommunications signal for compliance with at least two signal modes including using the group of eight bits in the 64K buffer to identify the 64K HDLC mode and using the seven least-significant bits in the 56K buffer to identify the 56K HDLC mode;
    when the evaluation indicates that the signal conforms to the 64K HDLC mode, processing the signal as a 64K HDLC mode signal; and
    when the evaluation indicates that the signal conforms to the 56K HDLC mode, processing the signal as a 56K HDLC mode signal.

2. The method of claim 1, and further comprising when the evaluation indicates that the signal does not conform to the 64K HDLC mode or the 56K HDLC mode, processing the signal as a third, different mode signal.

3. The method of claim 2, wherein contemporaneously evaluating the telecommunications signal for compliance with at least two signal modes comprises evaluating the telecommunications signal for up to 2 seconds.

4. The method of claim 1, wherein contemporaneously evaluating the telecommunications signal for compliance with at least two signal modes comprises generating a score for the at least two signal modes.

5. The method of claim 4, wherein generating a score comprises adding a point to the score for a mode when a flag is detected.

6. The method of claim 4, wherein generating a score comprises subtracting points from a score for a mode when an erroneous or aborted data frame is detected.

7. The method of claim 1, wherein contemporaneously evaluating the telecommunications signal for compliance with at least two signal modes comprises identifying the mode of the telecommunications signal when an error-free frame is decoded under one of the first and second modes.

8. The method of claim 1, wherein contemporaneously evaluating the telecommunications signal for compliance with at least two signal modes comprises calling a test function for use in identifying the 64K HDLC mode using the group of eight bits in the 64K buffer, and identifying the 56K HDLC mode using the seven least-significant bits in the 56K buffer.

9. The method of claim 1, wherein contemporaneously evaluating the telecommunications signal for compliance with at least two signal modes comprises:
    generating a score for first and second signal modes;
    when the score for the first signal mode exceeds a threshold, indicating that the telecommunications signal conforms to the first signal mode; and
    when the score for the second signal mode exceeds a threshold for the second signal mode and the score for the second signal mode exceeds the score for the first signal mode by a selected amount, indicating that the telecommunications signal conforms to the second signal mode.

10. A method, comprising:
    receiving the telecommunications signal, including:
        extracting a first group of bits from the telecommunications signal, the first group of bits including a second group of bits;
        loading the first group of bits into a first buffer suitable for use in determining a first HDLC signal mode;
        loading the second group of bits into a second buffer suitable for use in determining a second HDLC signal mode;
    contemporaneously evaluating the telecommunications signal for compliance with at least two HDLC signal modes, including using the first group of bits in the first buffer to identify the first HDLC signal mode and the second group of bits in the second buffer to identify the second HDLC signal mode;
    when the evaluation indicates that the signal conforms to the first HDLC signal mode, processing the signal as a first mode signal;
    when the evaluation indicates that the signal conforms to the second HDLC signal mode, processing the signal as a second mode signal; and
    when the evaluation indicates that the signal does not conform to the first HDLC signal mode or the second HDLC signal mode, processing the signal as a third, different mode signal.

11. The method of claim 10, wherein contemporaneously evaluating the telecommunications signal for compliance with at least two HDLC signal modes comprises evaluating the telecommunications signal for up to 2 seconds.

12. The method of claim 10, wherein contemporaneously evaluating the telecommunications signal for compliance with at least two HDLC signal modes comprises evaluating the telecommunication signal for compliance with a 56K HDLC signal mode and a 64K HDLC signal mode.

13. The method of claim 10, wherein contemporaneously evaluating the telecommunications signal for compliance with at least two HDLC signal modes comprises generating a score for the at least two HDLC signal modes.

14. The method of claim 13, wherein generating a score comprises adding a point to the sore for the HDLC signal mode when a flag is detected.

15. The method of claim 13, wherein generating a score comprises subtracting points from a score for the RDLC signal mode when an erroneous or aborted data frame is detected.

16. The method of claim 10, wherein contemporaneously evaluating the telecommunications signal for compliance with at least two HDLC signal modes comprises identifying the mode of the telecommunications signal when an error-free frame is decoded under one of the first HDLC signal mode and the second HDLC signal mode.

17. The method of claim 10, wherein contemporaneously evaluating the telecommunications signal for compliance with at least two HDLC signal modes comprises calling a test function for use in identifying the first HDLC signal mode using the first group of bits in the first buffer, and identifying the second HDLC signal mode using the second group of bits in the second buffer.

18. The method of claim 10, wherein contemporaneously evaluating the telecommunications signal for compliance with at least two HDLC signal modes comprises:

generating a score for the first HDLC signal mode and a score for the second HDLC signal mode;

when the score for the first HDLC signal mode exceeds a threshold, indicating that the telecommunications signal conforms to the first HDLC signal mode; and when the score for the second HDLC signal mode exceeds a threshold for the second HDLC signal mode and the score for the second HDLC signal mode exceeds the score for the first HDLC signal mode by a selected amount, indicating that the telecommunications signal conforms to the second HDLC signal mode.

19. A method, comprising:

receiving the incoming telecommunications signal, including:

extracting a first group of bits and a second group of bits from the telecommunications signal;

loading the first group of bits into a first buffer suitable for use in determining a first signal mode; and loading the second group of bits into a second buffer suitable for use in determining a second signal mode;

placing a digital signal processor associated with the incoming telecommunications signal in reset;

loading a code image into the digital signal processor, the code image including code for detecting the mode of the incoming telecommunications signal;

contemporaneously evaluating the incoming telecommunications signal for compliance with at least two different modes using the loaded code image to implement processes to detect the mode of the incoming telecommunications channel, including using the first group of bits in the first buffer to identify the first signal mode and the second group of bits in the second buffer to identify the second signal mode;

identifying the mode of the incoming telecommunications signal based on the evaluation; and processing the incoming telecommunications signal in the identified mode.

20. The method of claim 19, wherein contemporaneously evaluating the telecommunications signal for compliance with at least two different modes comprises evaluating the telecommunications signal for up to 2 seconds.

21. The method of claim 19, wherein contemporaneously evaluating the telecommunications signal for compliance with at least two different modes comprises generating a score for the at least two different modes.

22. The method of claim 21, wherein generating a score comprises adding a point to the score for a mode when a flag is detected.

23. The method of claim 21, wherein generating a score comprises subtracting points from a score for a mode when an erroneous or aborted data frame is detected.

24. The method of claim 19, wherein contemporaneously evaluating the telecommunications signal for compliance with at least two different modes comprises identifying the mode of the telecommunications signal when an error-free frame is decoded under one of the at least two different modes.

25. The method of claim 19, wherein contemporaneously evaluating the telecommunications signal for compliance with at least two different modes comprises calling a test function for use in identifying the first signal mode using the first group of bits in the first buffer, and identifying the second signal mode using the second group of bits in the second buffer.

26. The method of claim 19, wherein contemporaneously evaluating the incoming telecommunications signal for compliance with at least two different modes comprises:

generating a score for the first signal mode and the second signal mode;

when the score for the first signal mode exceeds a threshold, indicating that the telecommunications signal conforms to the first signal mode; and when the score for the second signal mode exceeds a threshold for the second signal mode and the score for the second signal mode exceeds the score for the first signal mode by a selected amount, indicating that the telecommunications signal conforms to the second signal mode.

27. A remote access system, comprising:

a processor based computer that is coupled to a network; and an adaptor card including:

an interface for communicating with the computer;

at least one digital signal processor that include a port for communicating data between the computer and a communications link, a telecommunications signal being received over the communications link, the telecommunications signal including a first group of bits and a second group of bits;

a first buffer to store the first group of bits from the telecommunications signal, the first buffer being suitable for use in determining a first signal mode;

a second buffer to store the second group of bits from the telecommunications signal, the second buffer being suitable for use in determining a second signal mode;

a processor, communicatively coupled to the digital signal processor, that loads a code image into the digital signal processor to implement processes to:

detect the mode of a telecommunications signal received over the communications link by contemporaneously evaluating the telecommunications signal for compliance with at least two HDLC signal modes, including identifying the first signal mode from the first group of bits in the first buffer and identifying the second signal mode from the second group of bits in the second buffer and process the telecommunications signal in the identified mode.

28. The system of claim 27, wherein the code image include code to contemporaneously evaluate the telecommunication signal for compliance with an HDLC mode for a period of up to two seconds.

29. The system of claim 27, wherein the code image includes code to keep a running score to evaluate the compliance of the telecommunications signal with the at least two modes.

30. The system of claim 27, wherein:

the first group of bits includes a group of eight bits from the telecommunications signal, the group of eight bits including seven least-significant bits;

the second group of bits includes the seven least significant bits;

the first buffer includes a 64K buffer suitable for use in identifying the first signal mode, the first signal mode including a 64K HDLC mode; and the second buffer includes a 56K buffer suitable for use in identifying the second signal mode, the second signal mode including a 56K HDLC mode.

31. A method, comprising:

extracting a first group of bits and a second group of bits from a telecommunications signal;

pushing the first group of bits into a first buffer, the first buffer and the first group of bits being suitable for use in identifying a first HDLC signal mode;

pushing the second group of bits into a second buffer, the second buffer and the second group of bits being suitable for use in identifying a second HDCL signal mode; and contemporaneously testing the first group of bits in the first buffer to test the telecommunications signal for the first HDLC signal mode and the second group of bits in the second buffer to test the telecommunications signal for the second HDLC signal mode.

32. The method of claim 31, wherein:

the first group of bits includes a group of eight bits from the telecommunications signal, the group of eight bits including seven least-significant bits;

the second group of bits includes the seven least significant bits;

the first buffer includes a 64K buffer suitable for use in identifying the first signal mode, the first signal mode including a 64K HDLC mode; and the second buffer includes a 56K buffer suitable for use in identifying the second signal mode, the second signal mode including a 56K HDLC mode.

33. The method of claim 31, wherein the second group of bits is selected from the first group of bits.

34. The method of claim 31, wherein contemporaneously testing the first group of bits and the second group of bits includes:

determining whether the first group of bits includes an error free data frame for the first HDLC signal mode, and calculating a first running score based on a comparison of the first group of bits to the first HDLC signal mode, the first running score being calculated for a predetermined period of time; and determining whether the second group of bits includes an error-free data frame for the second HDLC signal mode, and calculating a second running score based on a comparison of the second group of bits to the second HDLC signal mode, the second running score being calculated for the predetermined period of time.

35. The method of claim 31, wherein pushing the first group of bits into a first buffer includes pushing the first group of bits into a first FIFO buffer and pushing the second group of bits into a second buffer includes pushing the second group of bits into a second FIFO buffer.

* * * * *